United States Patent Office 3,199,027
Patented Aug. 3, 1965

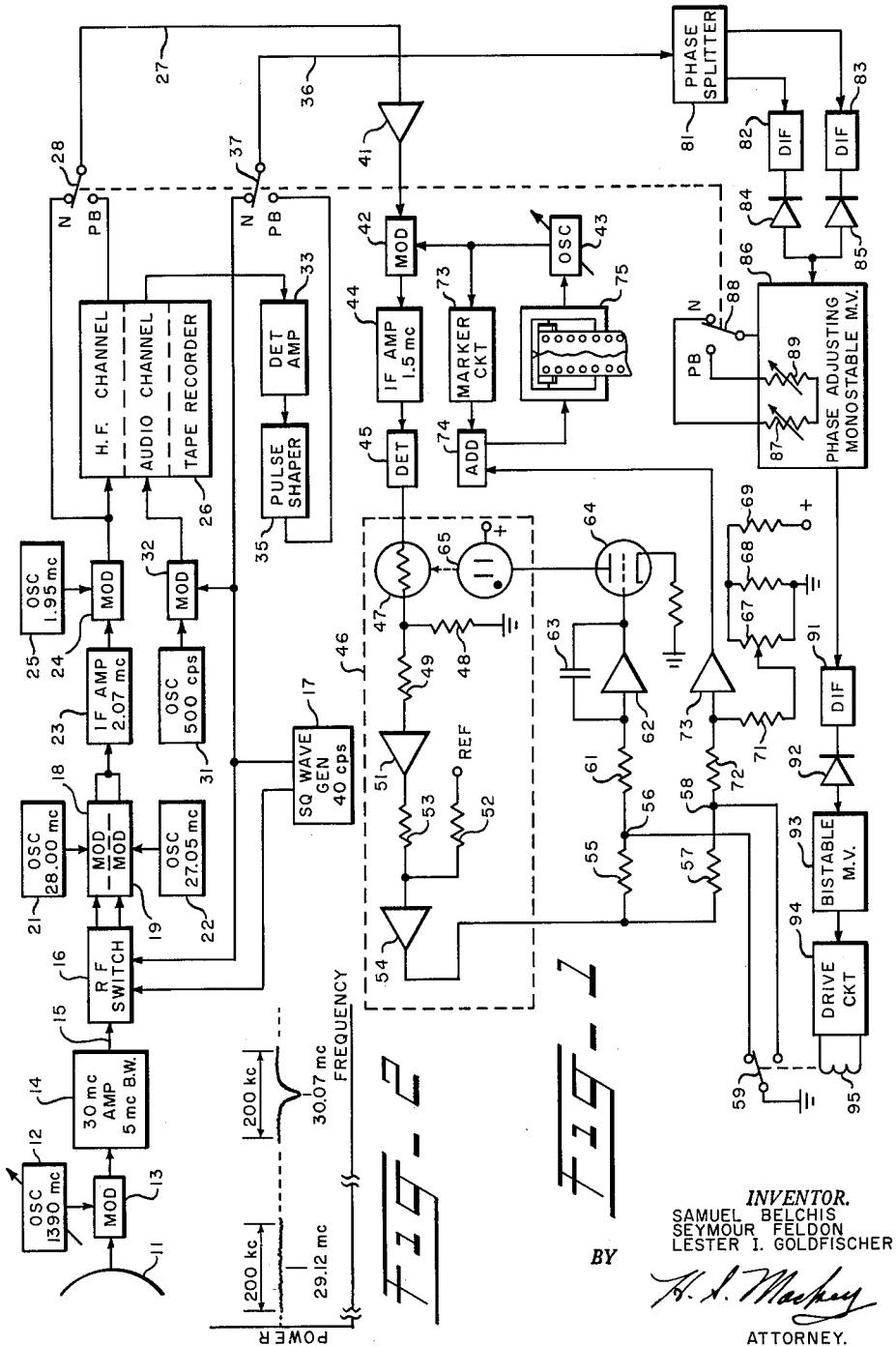

3,199,027
POWER LEVEL SPECTRUM RECORDER
AND ANALYZER
Samuel Belchis, Hartsdale, Seymour Feldon, Jamaica, and Lester I. Goldfischer, New Rochelle, N.Y., assignors to General Precision, Inc., a corporation of Delaware
Filed Sept. 11, 1961, Ser. No. 137,283
2 Claims. (Cl. 324—140)

This invention relates to frequency spectrum analyzers which determine the level of power present at various frequencies within a band of frequencies under examination.

In one class of spectrum analyzers, the power present at various frequencies within the band is determined by comparison with the power present in another, or reference, frequency band. In the past such a comparison has been made by examining small segments of the selected frequency band successively and comparing the power in each such segment with the average power level in the reference band. Such a technique requires, for accurate results, that the frequency response of the instrument be extremely flat and that the gain of the instrument not vary with time. These requirements can be met with sufficient accuracy for many purposes but some situations arise in which the gain stability requirements are extremely difficult to meet in a practical apparatus.

Consider the situation in which it is desired to analyze the power spectral density in a band of freqeuncies in which the power level differs from that of the reference band by less than one decibel. The instrument employed obviously should be capable of indicating power level variations of one tenth of a decibel or less and such indications must not be masked by or confused with instrumental errors of the same order of magnitude. It is extremely difficult to construct an instrument of the kind described above in which the amplifiers and other components have sufficient flatness of frequency response and sufficient gain stability to meet such stringent requirements. Accordingly there is a need for a spectrum analyzer in which the frequency response and gain stability requirements can be relaxed without impairing the ability of the instrument to distinguish between power levels differing by one tenth of a decibel or less.

It is a general object of the present invention to provide an improved spectrum analyzer.

Another object is to provide a spectrum analyzer suitable for determining the spectral power density of a band of frequencies having a power level within one decibel of the power level of a reference band of frequencies.

Another object is to provide a spectrum analyzer in which compensation is provided for variations in gain as a function of frequency.

Another object is to provide a spectrum analyzer in which compensation is provided for variations in gain as a function of time.

Briefly stated, the above objects are attained by apparatus in which a band of frequencies to be analyzed and a reference band of frequencies having the same width and a substantially uniform power distribution, time share a single processing channel in which each is converted to the same new band of frequencies which new band is selected for convenience of recording and/or analysis. The output of this single channel is passed through a circuit which operates effectively as a narrow band filter the pass band of which is swept slowly over the range of interest. The output of the filter circuit is detected and passed through a gain controlled amplifier after which the band to be analyzed and the reference band are separated. The amplitude of the reference band is utilized to control the gain of the amplifier while the amplitude of the band to be analyzed is displayed and/or recorded as a function of the pass band of the filter circuit.

By the above arrangement, the amplitude of the band being analyzed is referred to the amplitude of the reference channel once each time sharing cycle. Since the two bands pass through the same instrument channel at the same frequency, variations in gain affect both bands equally. Accordingly, the result displayed and/or recorded is the ratio of the two amplitudes, substantially unaffected by nonuniformities in frequency response of the instrument or by slow changes in gain.

For a clearer understanding of the invention reference may be made to the following detailed description and the accompanying drawing, in which:

FIGURE 1 is a schematic diagram, largely in block form, of a preferred embodiment of the invention; and FIGURE 2 is a diagram useful in explaining the invention.

The invention will be described as applied to a specific embodiment designed to analyze the power density of electromagnetic wave energy in the vicinity of the 21 centimeter hydrogen absorption line as received from radio stars.

*Background*

Electromagnetic wave energy has been detected as emanating from a number of stars, some located in our own galaxy and some located in other galaxies. The origin of such energy is not fully understood but has been observed to be of a noise-like character having substantially uniform amplitude over a very wide band of frequencies except at certain discrete frequencies where the amplitude may be higher or lower. One of these discrete frequencies is of particular interest for present purposes and occurs in the region of 1420 m.c.p.s. (21 cm.) which is the frequency of the hydrogen spectral line.

Electromagnetic wave energy from a number of so called radio stars, such as Cassiopeia A, Cygnus A, Taurus A and Sagittarius A, has been observed and found to exhibit a decrease in amplitude, or "notch" in the 1420 m.c.p.s. region. This notch is believed to be caused by the selective absorption of energy at this frequency by clouds of interstellar hydrogen existing between the source of radiation (the radio star) and the point of observation (the earth). The width and the depth of the notch observed, as well as the exact frequency at which it appears, are considerably different for the various sources and also vary with different observations of the same source. The notches vary in width from about 30 k.c.p.s. to 110 k.c.p.s. and rarely exceed 0.5 db in depth. Accordingly, accurate data can be obtained only by an extremely accurate instrument.

*The radio telescope*

The specific embodiment about to be described has been designed for use with the radio telescope at the Maryland Point Observatory of the Naval Research Laboratory. Referring to FIGURE 1, this telescope comprises a paraboloidal antenna 11 eighty-four feet in diameter capable of being directed toward any point in the sky. A "can" at the focus of the antenna contains equipment for converting energy received at any radio frequency to energy in the thirty megacycle band. This equipment comprises an extremely stable (one part in $10^{-7}$) oscillator 12 capable of being tuned over a wide range. The signals from the antenna 11 and the oscillator 12 are mixed in a crystal modulator 13, the output of which is led to an amplifier 14. This amplifier is a precision instrument having very stable gain characteristics and a very flat frequency response over a band in excess of five megacycles wide centered at thirty megacycles.

For the purpose of analyzing the spectrum in the region of the hydrogen absorption line, the oscillator 12 is tuned to approximately 1390 mc., with the result that the output of the amplifier 14 on conductor 15 is a spectrum having a power density versus frequency characteristic similar to that shown in FIGURE 2. The signal is noise-like in character and has substantially uniform amplitude over a wide range of frequencies except for a region of reduced amplitude. The frequency of the oscillator 12 is adjusted to make the center of this region fall at approximately 30.07 mc. The portion of the spectrum having substantially uniform amplitude is denoted the "continuum" signal while the portion in the region of reduced amplitude is denoted the "notch" signal. It is the purpose of the remainder of the apparatus to examine the notch signal closely and to compare its amplitude at various frequencies with the amplitude in a nearby portion of the continuum signal.

The receiver

The signal on conductor 15 is passed to a radio frequency switch 16 which diverts the incoming signal alternately to one or the other of two channels. The switch 16 may be any of several kinds but at present it is preferred to employ a beam switching vacuum tube such as a type 6AR8 controlled by two oppositely phased square waves of voltage obtained from a square-wave generator 17. The generator 17 generates a recurring switching signal and may be a free running multivibrator operating at a low audio frequency such as 40 c.p.s.

A pair of identical modulators 18 and 19 are provided each of which receives the signal from one of the two output channels of the switch 16. The modulator 18 also receives a signal from a stable oscillator 21 which is carefully constructed to maintain a constant amplitude output at exactly 28.00 mc. Similarly the modulator 19 receives a signal from a stable oscillator 22 which is similarly constructed to maintain a constant amplitude output at exactly 27.05 mc. The modulators 18 and 19 are identical and are entirely separate from each other except for a balancing control which is adjusted to make the outputs of the two modulators identical in amplitude. It is noted that the output of each of the modulators 18 and 19 is a spectrum approximately 5 mc. wide and that each output contains both the notch signal and a portion of the continuum signal.

The outputs of the modulators 18 and 19 are combined and applied to an intermediate frequency amplifier 23 which has bandpass characteristics with a substantially flat frequency response over a range of 200 kc. centered at 2.07 mc. The 200 kc. bandwidth was selected as suitable for analyzing a notch the expected width of which was 50 kc. or less, in order to allow some latitude in the position at which the notch appears and also in order to examine a portion of the skirts on each side of the notch. It will be understood that if substantially wider notches are to be examined it may be desirable to increase the bandwidth of the amplifier 23.

At the time intervals during which the input signal is applied to the modulator 18, the output of the amplifier 23 is a band of frequencies 200 kc. wide which includes the frequency shifted notch signal, formerly centered at 30.07 mc., as shown in FIGURE 2. When the input signal is being applied to the modulator 19, the output of the amplifier 23 is a band of frequencies 200 kc. wide which includes only a frequency shifted portion of the continuum signal, formerly centered at 29.12 mc., as shown in FIGURE 2. In other words, the output of the amplifier 23 is always a signal 200 kc. wide, centered at 2.07 mc., but alternately representing the notch signal and the continuum signal.

The present apparatus is arranged to record the received signal for future use, as well as to analyze the spectrum concurrently with reception. Accordingly the signal from the amplifier 23 is converted to a frequency range convenient for both recording and analysis. A modulator 24 receives the signal from the amplifier 23 and also receives a signal from a stable oscillator 25 which operates at 1.95 mc. The output of the modulator 24 is therefore a band of frequencies 200 kc. wide centered at 120 kc., or a band extending from 20 kc. to 220 kc. The modulator 24 is connected directly to one input of a tape recorder 26.

The tape recorder

The tape recorder 26 is required to record the band of frequencies from 20 kc. to 220 kc. One satisfactory recorder is the commercially available Ampex Model FR600 series. The particular recorder used has two recording tracks, or channels, one of which is a high frequency recording channel with substantially uniform frequency response up to 250 kc., and the other of which is an audio, or voice, channel with more limited frequency response. It is the high frequency channel which has its input connected to the modulator 24. An output conductor 27 may be connected, by means of a switch 28, either to the modulator 24 ("Normal") or to the high frequency channel output ("Playback").

The audio channel of the tape recorder 26 is used to record the switching signal from the square wave generator 17. The limited frequency response of this channel on the particular machine used in this embodiment makes it impractical to record the 40 c.p.s. square wave directly so instead this square wave is used to modulate 500 c.p.s. energy from an oscillator 31 by means of a modulator 32. The modulator 32 is connected to the input of the audio channel of the tape recorder 26 so that a 500 c.p.s. signal, amplitude modulated at 40 c.p.s., is recorded. Upon playback it is found that the square wave from generator 17 has been degraded in shape and accordingly the output of the audio channel is passed through a detector and amplifier 33 where the 40 c.p.s. modulation is recovered and then to a pulse shaping circuit 35, such as a Schmitt trigger circuit, which generates a square wave at 40 c.p.s. An output conductor 36 may be connected, by means of a switch 37 operated simultaneously with the switch 28, either directly to the square wave generator 17 or to the pulse shaping circuit 35.

The spectrum analyzer

The signal on the conductor 27 is a band of frequencies extending from 20 kc. to 220 kc. and represents alternately the notch and continuum signals, either as being received at the moment or as previously recorded, depending upon the position of the switches 28 and 37. This signal is further processed by connecting the conductor 27 to the input of an amplifier 41, the output of which is connected to one input of a modulator 42. The other input of the modulator 42 is connected to the output of a variable frequency oscillator 43 which is swept slowly over a range of frequencies. The output of the modulator 42 is connected to a bandpass intermediate frequency amplifier 44.

By way of example, the amplifier 44 may have a bandwidth of 2.6 kc. centered at 1.5 mc. The upper sideband output of the modulator 42 is used and the oscillator 43 may sweep from 1.28 mc. to 1.48 mc. in eight minutes. As the oscillator sweeps, a small segment of the spectrum, 2.6 kc. wide and continuously moving, appears at the output of the amplifier 44. Thus, except for the change in frequency, the oscillator 43, the modulator 42 and the amplifier 44 act effectively as a narrow band filter the pass band of which is swept over a range of 200 kc.

The output of the amplifier 44 is rectified by a linear detector 45. As previously mentioned, both the notch and continuum signals are noise-like in character. It has been shown that if random noise is detected with a linear rectifier, the unidirectional output voltage is proportional to the square root of the power at the input. For values near unity, it also may be shown that the ratio of the unidirectional voltages proportional to the square root of the power of two noise signals is very nearly equal to the ratio of the power of the two signals. Accordingly, the output of the detector 45 is a unidirectional voltage having two components, the ratio of the amplitudes of which is very nearly equal to the ratio of the power of the two components. These two components, representing the notch and the continuum signals, appear during alternate half cycles of the switching voltage of the square wave generator 17. It remains to determine and display this ratio.

Broadly speaking, the composite notch and continuum signal is passed through an amplifier the gain of which is controlled in accordance with the amplitude of the continuum signal. Then the amplitude of the notch signal represents the desired ratio. To this end the output of the detector 45 is connected to the input of a controllable gain amplifier denoted generally by the reference character 46. After passing through the amplifier 46, the continuum and notch signals are separated; the continuum signal controls the gain of the amplifier; and the notch signal is led to the display circuit.

Examining the apparatus in more detail, the output of the detector 45 is connected to a voltage divider comprising a photoresistor 47, the resistance of which is a function of incident light, and an ordinary resistor 48. The junction of these resistors is connected through a resistor 49 to the input of a high gain direct coupled amplifier 51. The output of this amplifier is combined with a reference unidirectional voltage of opposite polarity by means of summing resistors 52 and 53. The resulting voltage is amplified by another high gain direct coupled amplifier 54.

The output of the amplifier 54 is connected through a large resistor 55, on the order of 200,000 ohms, to a junction 56 and is also connected through a similar resistor 57 to a junction 58. These junctions are alternately grounded by means of a single-pole double-throw switch 59 which is operated, by means to be more fully explained, in synchronism with the operation of the RF switch 16 by the voltage from the square wave generator 17. The junction 56 is grounded during the half cycle when the switch 16 is applying the signal to the modulator 18, that is, when the notch signal appears at the output of the amplifier 54. Similarly, the junction 58 is grounded during the half cycle when the switch 16 is applying the signal to the modulator 19, that is, when the continuum signal appears at the output of the amplifier 54. The large resistors 55 and 57 isolate the junctions 56 and 58 from the output of the amplifier 54 so that although one junction is grounded, the amplifier output may appear at the other junction. The net result is that the continuum signal and only the continuum signal appears at the junction 56 while the notch signal and only the notch signal appears at the junction 58.

The junction 56 is connected to an integrating circuit comprising an input resistor 61, a high gain polarity reversing direct coupled amplifier 62 and a large feedback capacitor 63. The integrator operates in the usual manner to hold its output voltage constant in the absence of an input signal and, in the presence of an input, to increase or decrease its output voltage, depending upon the polarity of the input. The output of the integrator controls the grid potential of a vacuum tube 64, the anode current of which passes through a neon lamp 65. The light from the lamp 65 is directed to fall on the photoresistor 47. Thus, the gain of the amplifier 46 is controlled by the amplitude of the continuum signal. It is obvious that the circuit operates to make the input to the amplifier 54, and the potential of the junction 56, zero on the average. If these potentials are not zero, any voltage at the input to the amplifier 54 will be amplified and applied to the integrator, the output of which will rise (or fall), thereby varying the current through the tube 64, the light emitted by the lamp 65 and the resistance of photoresistor 47 until the input is zero, after which the integrator output and the gain of the amplifier will remain constant.

The overall effect of the above described gain control loop is to make the output of the amplifier 54 zero during reception of the continuum signal. During reception of the notch signal the gain control loop is inoperative, because of the grounding of the junction 56, and the potential of the output of the amplifier 54 and of the junction 58 assumes whatever potential is dictated by the amplitude of the notch signal.

A potentiometer 67 is connected in parallel with a resistor 68, the combination being connected in series with a resistor 69 which is connected to a unidirectional voltage source. The potential of the wiper of the potentiometer 67 is added to the potential of the junction 58 by summing resistors 71 and 72 in order to establish a convenient unidirectional voltage level for the notch signal. The junction of resistors 71 and 72 is connected to the input of a direct coupled amplifier 73, the output of which is connected through an adding circuit 74 to the input of a pen recorder 75. The amplifier 73 includes a smoothing factor since the notch signal appears at the input only one-half of the time.

The pen recorder 75 includes the usual paper chart which is advanced at a uniform rate and a pen the position of which is determined by the amplitude of the applied signal. A potentiometer (not shown) within the pen recorder is geared to the paper drive mechanism and provides the drive signal for the sweep oscillator 43 so that the position of the paper at any time represents the instantaneous frequency of the oscillator. Since the frequency of the oscillator 43 determines the frequency of the signal passed by the amplifier 44, the position of the paper represents the frequency of the signal.

Although not essential to the invention, an arrangement for marking on the chart one or more points corresponding to known frequencies is a great convenience and a circuit for this purpose is shown at 79 in the drawing. The marker circuit 79 is connected to the output of the oscillator 43 and may comprise, for example, several tuned circuits such as crystals resonant at predetermined frequencies to provide relatively large signals at these frequencies which may be rectified and combined, through the adding circuit 74, with the input signal.

*The switch drive apparatus*

In the previous explanation it was stated that the junctions 56 and 58 are grounded in synchronism with the operation of the RF switch 16. Since the amplifiers 51, 54, 63 and 73 have very high gain, a low resistance ground is required. Switched diodes have been found to be less than entirely satisfactory and a mechanical switch is preferred to provide a ground having sufficiently low resistance.

The mechanical switch must be driven at the 40 c.p.s. rate but, due to the phase delay introduced both by the inertia of the mechanical elements and the inductance of the driving coil, it is not practical to operate the switch directly from the output of the square-wave generator 17. Accordingly, additional apparatus is provided to generate a driving voltage of the proper phase to close the contacts of the switch 59 in exact synchronism with the switching voltage of the generator 17.

The 40 c.p.s. square wave on conductor 36 is led to a phase splitting circuit 81 such as a split load vacuum tube circuit which generates two 40 c.p.s. square waves of voltage 180° out of phase with each other. These voltages are passed through differentiating circuits 82 and 83 to generate sharp pulses, are rectified by rectifiers 84 and 85, and combined. The result is a series of sharp pulses of the same polarity having a repetition frequency of 80 c.p.s.

The 80 c.p.s. pulses trigger a monostable multivibrator 86 from its stable to its unstable state. In such a multivibrator the time required for return to the stable state can be controlled by adjusting the time constant of the circuit. Various configurations of multivibrators can be used and the location of the adjusting element depends upon the circuit selected. Such multivibrator circuits are well known and accordingly this specification has not been burdened with the circuit details. Suffice it to say that in the specific embodiment being described, adjustment of an anode resistor provides satisfactory control and there is shown a variable resistor 87 for adjusting the duration of the unstable state. This resistor is used during "normal" operation, that is, when the spectrum is being analyzed during reception. A switch 88, operated simultaneously with the switches 28 and 37, substitutes a resistor 89 for the resistor 87 when a previously recorded spectrum is being analyzed. Separate resistors are required because the process of modulating, recording, demodulating and shaping of the timing waveform results in a phase shift relative to the original timing wave from the generator 17. The output of the multivibrator 86 is passed through a differentiating circuit 91 and a rectifier 92. The overall result is that the multivibrator 86 receives a first series of 80 c.p.s. pulses. The output of the rectifier 92 is a second series of 80 c.p.s. pulses, all having the same polarity and the phase of which may be adjusted.

The 80 c.p.s. pulses from the rectifier 92 are used to trigger a bistable multivibrator 93 which in response thereto generates a symmetrical square wave of voltage having a frequency of 40 c.p.s. The output of the multivibrator 93 controls a drive circuit 94 which provides the power necessary to energize an operating winding 95 which magnetically controls the switch 59. Various drive circuits can be used, one satisfactory kind comprising thyratrons which can supply substantial output power controlled by a small amount of input power.

The switch drive circuit above described, comprising the chain of components from the phase splitter 81 to the operating winding 95, assures the operation of the switch 59 in synchronism with the square wave voltage from the generator 17.

*Résumé of operation*

The antenna 11 and the apparatus at its focus comprising the oscillator 12, the modulator 13 and the amplifier 14, provide a signal on the conductor 15 which is over five mc. wide, centered at 30 mc., and which includes both the notch and a portion of the continuum signal.

The receiver converts the signal to two components, each 200 kc. wide and centered at 120 kc. One component represents the notch signal, the other the continuum signal and both appear, on a time shared basis, at the output of the modulator 24.

The tape recorder 26 records both components on the high frequency channel and records the switching reference on the audio channel.

The spectrum analyzer receives a signal, either directly from the modulator 24 or from the playback output of the tape recorder 26, and passes it through a circuit which is, in effect, a narrow band filter, the pass band of which is swept over a range of frequencies. The signal passes through the amplifier 46 after which the notch and continuum signals are separated, the continuum signal controlling the gain of the amplifier 46 and the notch signal being passed to the pen recorder 75.

The switch drive circuit accepts a switching reference signal, either from the generator 17 or from the tape recorder 26, and generates a waveform which operates the switch 59 in synchronism with the switching signal of generator 17.

It is noted that both the notch and the continuum signals pass through the same components, namely, the amplifier 23, the modulator 24, the tape recroder 26, the amplifier 41, the modulator 42, the amplifier 44, the detector 45 and the amplifier 46, at the same frequency. Any nonuniformity of frequency response therefore affects both signals equally. Furthermore, the sweep filter (modulator 42, oscillator 43 and amplifier 44) samples small segments of both the notch and continuum signals, each forty times per second, and the gain of the amplifier 46 is subject to readjustment forty times per second. Therefore, slow changes in gain of any of the amplifiers have little or no effect.

It is apparent that the present invention provides an improved recording system and spectrum analyzer in which the frequency response and gain stability requirements of individual components have been greatly relaxed without adversely affecting the accuracy of the instrument.

Although a preferred embodiment of the invention has been described in considerable detail, many modifications within the spirit of the invention will occur to those skilled in the art. It is therefore desired that the protection afforded by Letters Patent be limited only by the true scope of the appended claims.

What is claimed is:

1. Apparatus for indicating the relative power level of first and second unidirectional voltages which appear alternately on a time shared basis on a single transmission channel, comprising, a variable voltage divider connected to said transmission channel, a first direct coupled amplifier connected to the output of said voltage divider, a reference source of unidirectional voltage having a polarity opposite to that of the output of said first amplifier, means for combining said reference voltage with the output voltage of said first amplifier to obtain a combined voltage, a second direct coupled amplifier having its input energized by said combined voltage, means connected to the output of said second amplifier for controlling said voltage divider to make the output of said second amplifier zero during the appearance of said first voltage on said single channel, and means for indicating the amplitude of the output of said second amplifier during the appearance of said second voltage on said single channel.

2. Apparatus for indicating the relative power level of first and second unidirectional voltages which appear alternately on a time shared basis on a single transmission channel, comprising, a variable voltage divider connected to said transmission channel, a first direct coupled amplifier connected to the output of said voltage divider, a second direct coupled amplifier, a reference source of unidirectional voltage having a polarity opposite to that of the output of said first amplifier, means for combining said reference voltage with the output voltage of said first amplifier and for applying the resulting voltage to the input of said second amplifier, means operated in synchronism with the appearance of said first and second voltages on said single channel and connected to the output of said second amplifier for generating third and fourth unidirectional voltages representing amplified versions of said first and second voltages respectively, means responsive to said third voltage for controlling said voltage divider to make the output of said second amplifier zero during the appearance of said first voltage on said single channel, and means for indicating the amplitude of said fourth voltage.

References Cited by the Examiner

UNITED STATES PATENTS

| | | | |
|---|---|---|---|
| 2,367,746 | 1/45 | Williams | 324—100 X |
| 2,465,500 | 3/49 | Wallace et al. | |
| 2,490,530 | 12/49 | Loughlin | 324—77 X |
| 2,525,675 | 10/50 | Heller | 324—140 X |
| 2,695,360 | 11/54 | Goldmark | 325—332 X |
| 2,913,668 | 11/59 | Lide | 324—140 |
| 2,996,667 | 8/61 | Galbreath | 324—77 |
| 3,045,181 | 7/62 | Jaffe et al. | 324—77 |

WALTER L. CARLSON, *Primary Examiner.*